Dec. 15, 1970  H. N. BEHNKE  3,546,988
APPARATUS FOR RAPIDLY GROOVING PIPE
Filed Dec. 26, 1968  3 Sheets-Sheet 1
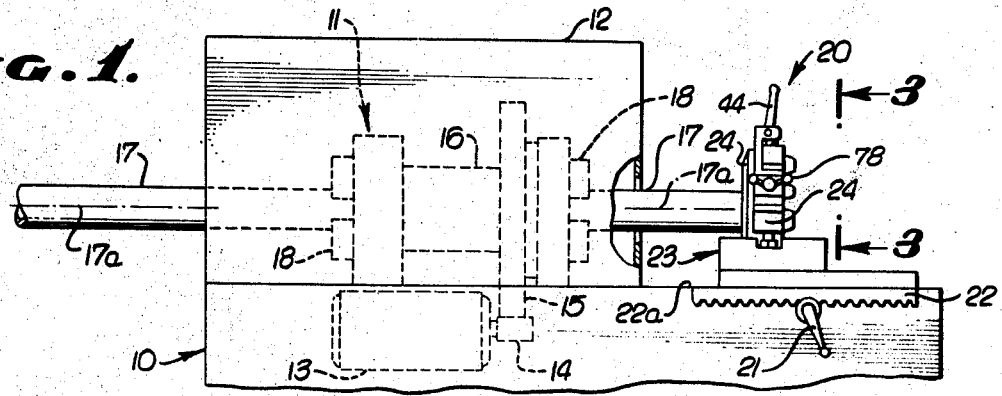
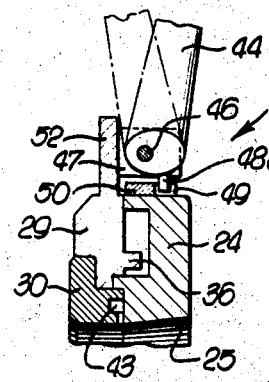
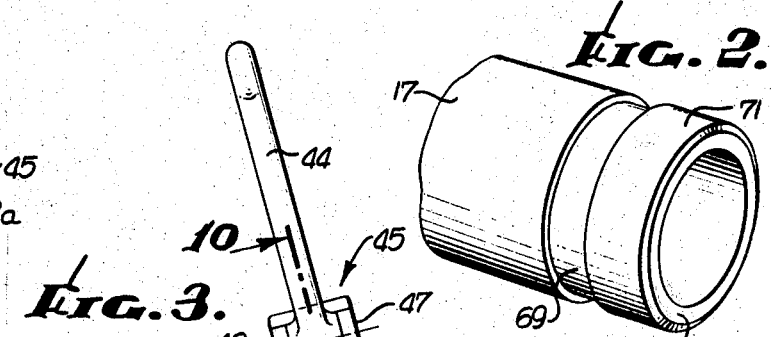
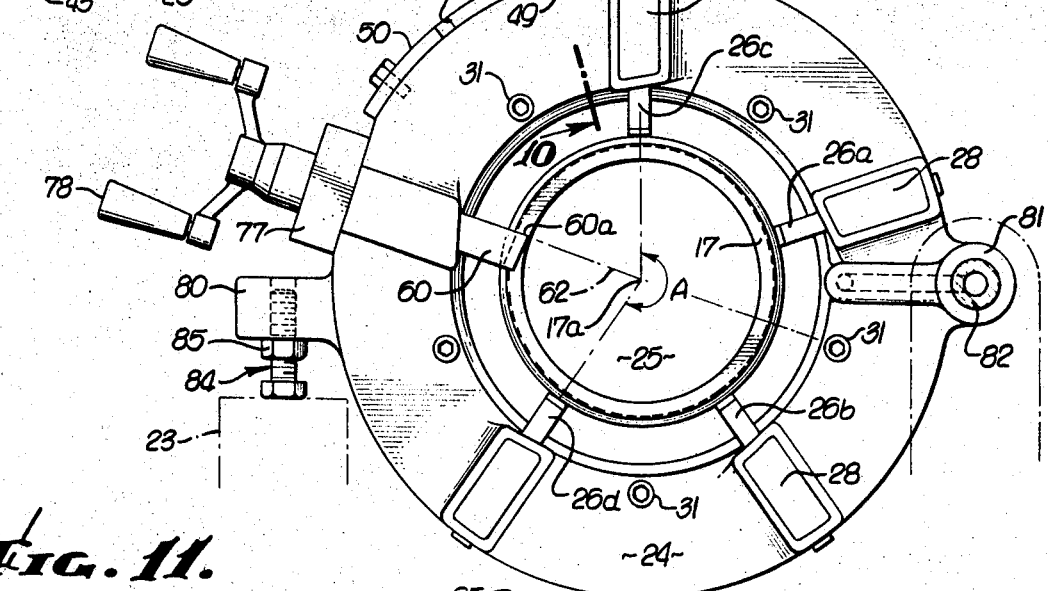
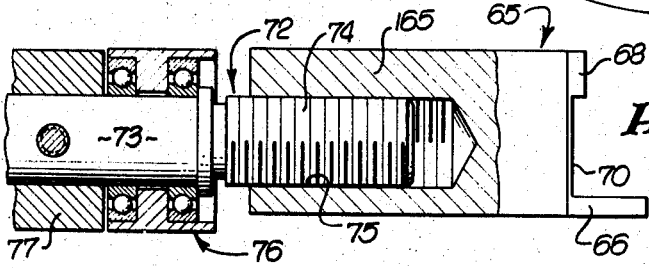
INVENTOR.
HOWARD N. BEHNKE
BY White & Haefliger
ATTORNEYS.

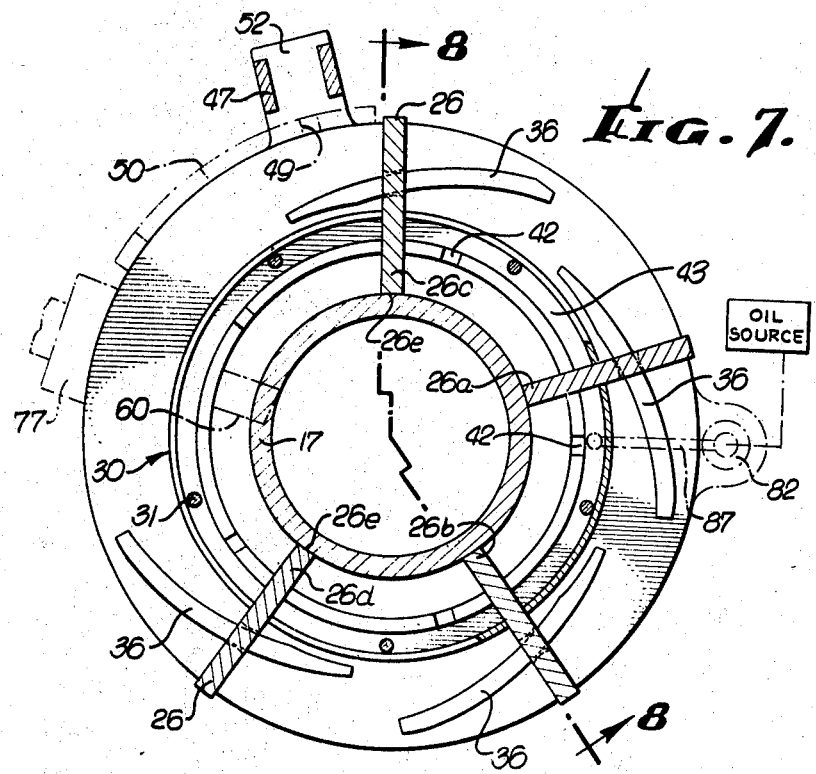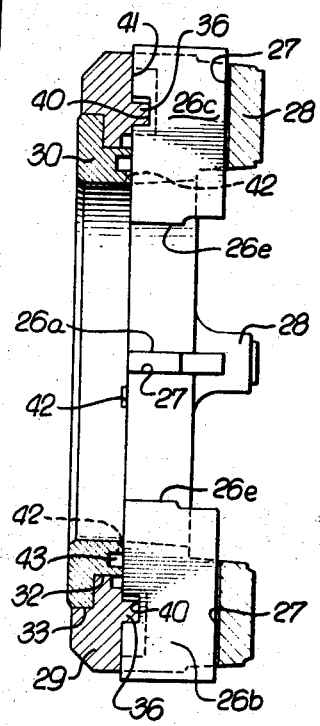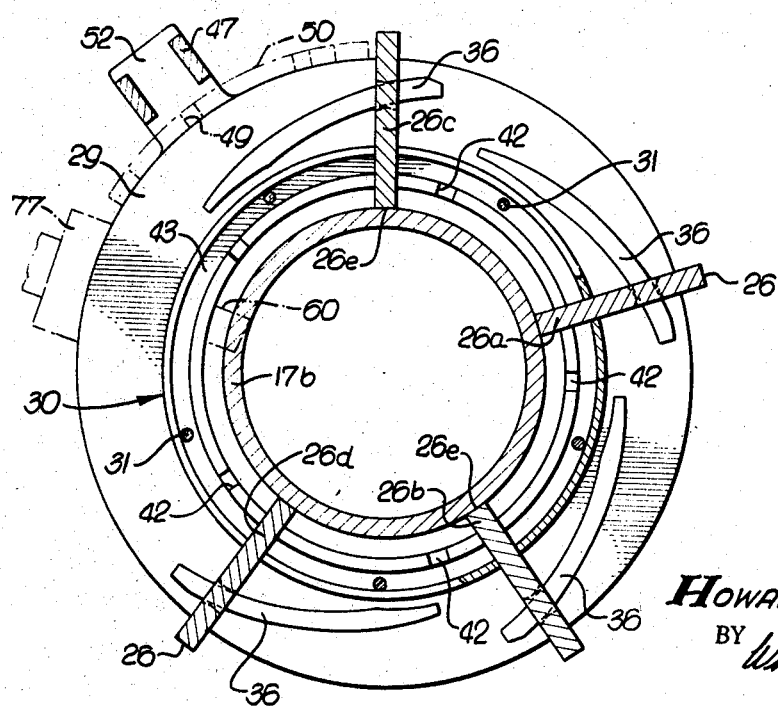

United States Patent Office 3,546,988
Patented Dec. 15, 1970

3,546,988
APPARATUS FOR RAPIDLY GROOVING PIPE
Howard N. Behnke, San Gabriel, Calif., assignor to Collins Machinery Corporation, Monterey Park, Calif., a corporation of California
Filed Dec. 26, 1968, Ser. No. 786,963
Int. Cl. B23b 3/04, 5/14, 5/00
U.S. Cl. 82—78                     14 Claims

ABSTRACT OF THE DISCLOSURE

The disclosure concerns apparatus for selectively centering and supporting rotating pipe of various sizes, and relative to a cutting tool which may be selectively presented to the pipe; all at various positions along the pipe.

BACKGROUND OF THE INVENTION

This invention relates generally to apparatus for cutting pipe; more particularly it concerns accurate centering and simultaneous cutting of pipe at selected locations spaced endwise from pipe rotating mechanism, and along the pipe.

Cutting or grooving of pipe ends is typically carried out while the pipe is rotating. Precision grooving is made difficult by accuracy destroying deflection of the cantilever pipe extent from true centered condition, and by the necessity for stopping the groove cutting operation in order to measure the groove depth. Such deflection may arise either from the loading exerted by the groove cutting tool against the pipe, or from inaccurate centering of the pipe by the rotating apparatus, or from both of these factors.

SUMMARY OF THE INVENTION

It is a major object of the invention to provide apparatus characterized as overcoming the above-mentioned difficulties in an unusually effective and simple manner. Basically, the invention is embodied in apparatus that comprises, in combination, a housing forming a central through opening to receive pipe for rotation about the pipe axis; a series of pipe centering guides carried by the housing and disposed about that axis for centering engagement with the pipe periphery; first manually operable means on the housing for simultaneously displacing the guides toward and away from the pipe axis and for retaining the guides at selected locations of centering engagement with the rotating pipe periphery; a cutting tool carried by the housing for cutting presentment to the pipe; and other manually operable and controllable means on the housing for moving the tool relative to the pipe to engage and cut the rotating pipe. As will be seen, the housing, guides and cutter are located at a station along the pipe which may be axially removed from means at a first station including one or more sets of swingable jaws which engage the pipe periphery and rotate the pipe about that axis.

Further, the guides and tool are preferably generally circularly spaced about the pipe axis in a manner minimizing pipe deflection tendencies during cutting, there being two pairs of such guides in one form of the invention. In addition, the cutting tool may be non-rotary and subject to radial advancement on the housing (which also carries the pipe centering guides) by a rotary element which is manually controllable separately from manual control of the radial positioning of the guides. The latter accommodates centering of pipe of different sizes, as will be described.

As regards the cutting tool, it may advantageously include a locating shoulder engageable with the pipe end in different radial positions of the tool; a groove cutter spaced from that shoulder and engageable with the pipe periphery for grooving the pipe; and a stop shoulder between the cutter and locating shoulders and presented toward the pipe axis when the cutter has formed a pipe groove of sufficient depth. One use for such pipe grooving is to retain a coupler used to connect two pipe ends which have been similarly grooved.

A further feature of the invention concerns the provision of lubricant orifices and channels for feeding lubricant under pressure to the pipe centering guides and cutter.

These and other objects of the invention, as well as the details of an illustrative embodiment, will be more fully explained in the following description and drawings, in which:

DRAWING DESCRIPTION

FIG. 1 is a side elevation showing the overall apparatus for mounting and rotating pipe, together with apparatus for cutting the pipe in the manner to be described;

FIG. 2 is a perspective view of a pipe end which has been cut (end faced and grooved) in the manner to be described;

FIG. 3 is an enlarged elevation showing the front of the pipe-cutting apparatus;

FIG. 7 is an elevation showing guiding and cutting of pipe of reduced diameter;

FIG. 8 is a section taken on line 8—8 of FIG. 7;

FIG. 9 is a view like FIG. 7 showing guiding and cutting of pipe of enlarged diameter;

FIG. 10 is an enlarged fragmentary showing of an indexing means on the apparatus; and FIG. 11 is an enlarged fragmentary showing of the radial adjustment for the pipe cutting apparatus.

DESCRIPTION OF PREFERRED EMBODIMENT

Figure 4:
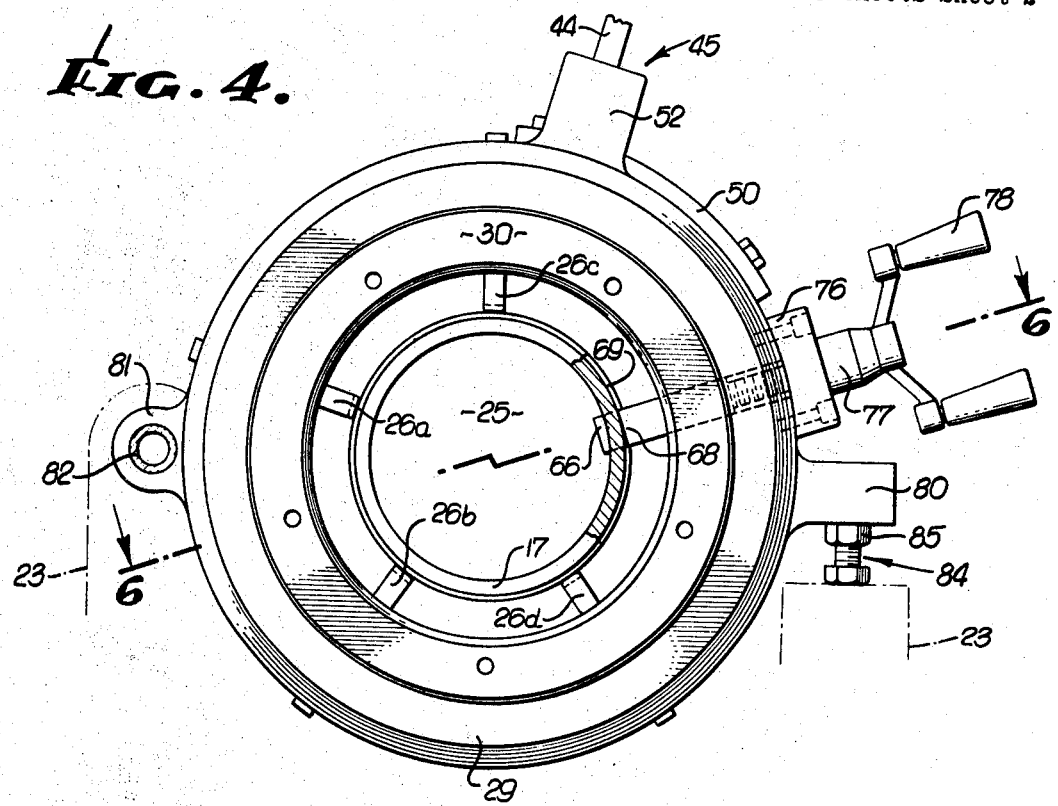
FIG. 4 is an elevational view of the rear of the FIG. 3 apparatus.
Figure 5:
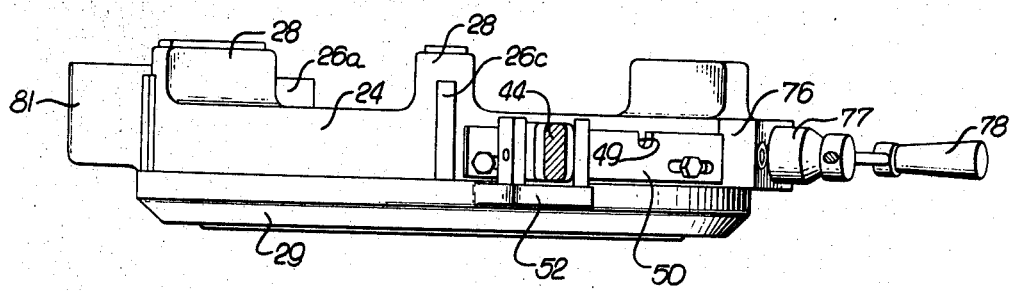
FIG. 5 is a top plan view of the FIG. 4 apparatus.

Referring first to FIG. 1, the apparatus includes a support table 10 carrying a drive generally indicated at 11 and within a housing 12. The drive includes an electric motor 13 driving a pinion gear 14 which in turn drives a large ring gear 15 supported for rotation by structure 16. A pipe to be cut or grooved is shown at 17, defining an axis 17a extending generally horizontally through the drive, and to be gripped and then rotated by swingable jaws 18 at opposite ends of the drive. Such jaw swinging and rotation with structure 16 occurs in response to rotation of gear 15, there being mechanism to cause the jaws to swing inwardly to center, grip and rotate the pipe at the station indicated. One advantageous form of such mechanism is described in U.S. Pat. 3,274,627.

The invention is more particularly concerned with means at another station 20 along axis 17a for centering and cutting the rotating pipe. Note in this regard the capability for moving that means lengthwise of table 10, as by rotating a handle 21 to displace rack 22 lengthwise, the rack being attached via carriage 23 to the housing 24. Carriage 23 rides lengthwise along way 22a.

The annular housing 24 forms a central through opening 25 to receive the pipe 17 for rotation about axis 17a. A series of pipe centering guides 26 is carried by the housing and disposed about axis 17a for centering engagement with the pipe periphery. The guides are shown in FIG. 8 as received within radial slots 27 in the housing, such slots typically being formed within bosses 28 appearing in FIG. 3. Such slots open toward the front side of the housing, so that the guides 26 may be presented toward annular body 29 rotatable on a retaining ring 30. The latter is attached by as fasteners 31 to the housing, and forms annular step shoulders 32 and 33 on which corresponding shoulders 34 and 35 of the body slide during body rotation.

Body 29 carries a series of scroll cams 36, one for each guide 26, spiraling about axis 17a and located to effect simultaneous inward advancement, or outward retraction, of the guides 26 upon relative annular movement of the body and housing members. For example, FIG. 8 shows the body in one angular position corresponding to guiding or bearing engagement of the guide terminals 26e with pipe 17 of reduced outer diameter, whereas, FIG. 9 shows the body 29 in a second (counterclockwise displaced) angular position corresponding to guiding engagement of terminals 26e with pipe 17b of relatively larger outer diameter. In this regard, the guides 26 may have notches 40 to receive the cams 36 outstanding from the face 41 of the body 29, as is clear from FIG. 8. The latter figure also shows the provision of oil or lubricant orifices 42 directed at circularly spaced locations ring 30 proximate the housing, to pressure feed or jet lubricant from the annular groove 43 in the ring to the guides, as well as to the cutter to be described.

Control structure including a latch handle 44 is provided to rotate body 29 about axis 17a relative to the housing and to interlock the body and housing at predetermined positions corresponding to guide positions of centering engagement with pipe of different sizes. For example, the handle 44 of latch 45 projects upwardly, as seen in FIGS. 1 and 3, a pivot 46 connects the handle to the clevis 47 on body 29 for rocking about a second axis 48 between the full and broken line positions seen in FIG. 10. In this latter position, the body 29 may be rotated about axis 17a by pulling or pushing on the handle about that axis; whereas in full line position of the handle in FIG. 10 such rotation is blocked as by engagement of latch dog 48a in one of a series of notches 49 formed by arcuate plate 50 attached to the housing. These notches are spaced about axis 17a at positions corresponding to body positions at which the guides 26 may have centering engagement with pipe of predetermined sizes. Note that the weight of the handle 44 tends to retain it in full line position seen in FIG. 10, to maintain the latching together of the body and housing members, throughout the range of handle positions corresponding to the notches 49. A stop 52 limits swinging of the handle to the left in FIG. 10, to maintain the handle in upright leftward position so that it may be pushed or pulled to rotate the body as described.

As mentioned, a cutting tool is carried by the housing 24 for cutting presentment to the pipe, one such tool being shown as 60 in FIG. 3, with a cutter 60a in cutting engagement with the pipe, forming a groove 61. It will be noted that the tool and axis 17a define an axial radial plane 62 at opposite sides of which the two pairs of guides 26 respectively extend. Note further that plane 62 bisects the angle between corresponding guides at opposite sides of the plane, whereby radial loading exerted on the pipe is primarily and equally transmitted to the two symmetric guides 26a and 26b and centering of the rotating pipe is maintained. Finally, symmetric (with respect to plane 62) guides 26c and 26d block deflection of the pipe normal to plane 62; guides 26c and 26d block deflection of the pipe toward the cutter 60a, and guides 26a and 26b block deflection of the pipe away from the cutter (i.e. parallel to plane 62). Note that the angle A between guides 26c and 26d and encompassing guides 26a and 26b is in excess of 180°.

Figure 6:
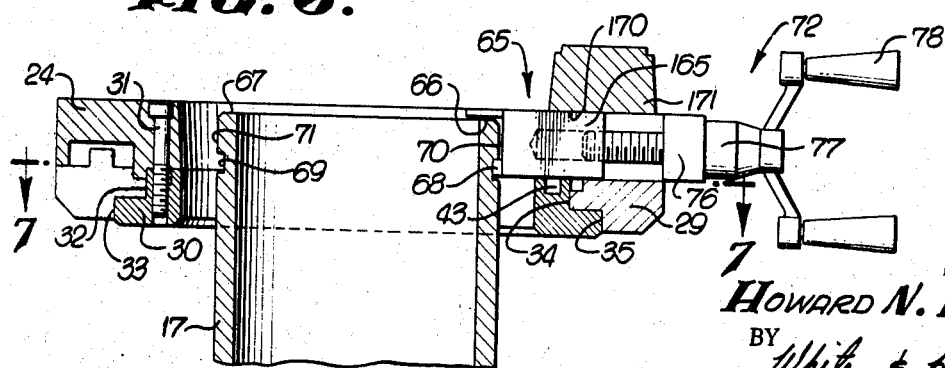
FIG. 6 is a section taken on line 6—6 of FIG. 4.

Another particularly useful tool 65 is shown in FIGS. 6 and 11 to comprise a locating shoulder 66 engageable with the pipe end 67 in different radial positions of the tool; a groove cutter 68 spaced from shoulder and engageable with the pipe periphery for grooving the pipe (as indicated by finished groove 69 in FIG. 2); and a stop shoulder 70 between cutter 68 and shoulders 66 and presented toward axis 17a to engage the pipe periphery at 71, limiting tool inward advancement toward axis 17a. This achieves rapid and accurate grooving of pipe to selected and automatically controlled depth, without pipe deflection during grooving, due to the location of the guides 26 and cutter 68 in generally the same plane normal to that axis 17a.

Referring to FIGS. 3, 6 and 11, the tool 65 is shown as having a guide element 165 received in a slot 170 in the boss 171 on the housing, element 165 being non-rotary, whereby the tool is guided radially. Manually operable means for moving the tool radially to engage and cut the pipe may typically and advantageously include a rotary element 72 (as for example shaft 73) projecting radially toward the pipe and having a threaded extent 74 with threaded engagement at 75 with the element 165. Shaft 73 is carried by the housing for rotation, as via bearings 76, and retained against radial movement relative to the pipe axis, whereby its rotation moves the tool 65 radially. Such retention may be provided by structure 77. A handle 78 on shaft 73 enables ready manually controlled feeding of the tool 65.

Tool 65 may be quickly changed as by removal toward axis 17a with no pipe inserted through bore 25. Guides 26 may be quickly changed upon removal of guide ring 30 and body 29 from the housing.

Housing 24 is supported on carriage 23 as by lugs 80 and 81 projecting at horizontally opposite sides of the housing. Annular lug 81 turns on a tubular shaft 82 on carriage 23 whereby the housing may be pivoted clockwise in FIG. 3, lifting lug 80. This enables vertical positioning of the housing, and exact positioning is achieved by adjustment of jack screw 84 threaded in lug 80, and tightening of nut 85 against the underside of that lug. Screw 84 rests on carriage 23.

Note that pressurized lubricant feed to channel 43 may be advantageously achieved from the interior of shaft 82 and via a duct 87 leading to the channel 43 from the shaft.

I claim:

1. In apparatus for rapidly cutting pipe, the combination comprising
   (a) a housing forming a central through opening to receive pipe for rotation about a pipe axis;
   (b) a series of pipe centering guides carried by the housing and disposed about said axis for centering engagement with the pipe periphery;
   (c) first manually operable means on the housing for simultaneously displacing said guides toward and away from said axis and for retaining said guides at selected locations of centering engagement with the rotating pipe periphery;
   (d) a cutting-tool carried by the housing for cutting presentment to the pipe; and
   (e) other manually operable and controllable means on the housing for moving said tool relative to the pipe to engage and cut the rotating pipe.

2. The combination of claim 1 wherein said guides and tool are generally circularly spaced about said axis.

3. The combination of claim 2 wherein there are two pairs of said guides respectively at opposite sides of an axial radial plane passing through said tool and said axis.

4. The combination of claim 3 wherein said guides define an arc about said axis in excess of 180°.

5. The combination of claim 1 wherein said other manually operable means includes a non-rotary element integral with said tool and guided by said housing for generally radial movement, and a rotary element projecting generally toward said pipe axis and having threaded engagement with said non-rotary element, said rotary element carried by the housing and retained against radial movement relative to the pipe axis.

6. The combination of claim 2 wherein said first manually operable means includes a body rotatable about said axis relative to the housing to move the guides radially, and control structure including a handle movable to rotate said body about said axis relative to the housing and to interlock the body and housing at predetermined positions corresponding to guide positions of engagement with pipe of different sizes.

7. The combination of claim 2 wherein said tool includes a locating shoulder engageable with the pipe end in different radial positions of the tool, and a cutter spaced from said shoulder and engageable with the pipe periphery for grooving the pipe.

8. The combination of claim 7 wherein said tool includes a stop shoulder between said cutter and locating shoulder and presented toward said axis to limit tool inward advancement toward the pipe axis when the cutter has formed a pipe groove of predetermined depth.

9. The combination of claim 2 wherein lubricant channeling is formed proximate said housing to feed lubricant to said guides.

10. In apparatus for rotating and adjustably cutting pipe defining an axis, the combination comprising
    (a) first means at a first station along said axis including jaws spaced about that axis and swingable to engage the pipe periphery and to rotate the pipe about that axis;
    (b) second means at another station along said axis and including guides spaced about that axis and movable radially to engage the pipe periphery for centering the rotating pipe, said second means including housing structure; and
    (c) a cutter carried by said housing structure for movement into engagement with the rotating pipe and for movement relative to the pipe during said engagement therewith.

11. The combination of claim 10 wherein said housing extends annularly and said guides and cutter are spaced about said axis.

12. The combination of claim 11 wherein said second means includes a body rotatable about said axis relative to said housing to move said guides radially, and control structure including a handle movable to rotate said body about said axis relative to said housing and to interlock the body and housing at predetermined positions corresponding to guide positions at selected pipe diameters.

13. The combination of claim 11 including a support for said first and second means, and characterized in that said second means is movable on the support toward and away from said first means.

14. The combination of claim 11 including manually operable and controllable means on the housing moving said cutter relative to the pipe during said engagement therewith.

References Cited

UNITED STATES PATENTS

| | | | |
|---|---|---|---|
| 167,645 | 9/1875 | Cohen et al. | 82—72X |
| 1,082,652 | 12/1913 | Roth | 82—20 |
| 2,568,566 | 10/1951 | Hoffman | 82—70.1 |
| 2,845,827 | 8/1958 | Brauer | 82—20 |
| 2,966,819 | 1/1961 | Pealer | 82—78 |
| 3,024,687 | 3/1962 | Brownstein | 82—101X |
| 3,173,318 | 3/1965 | Lindemann | 82—53.1X |
| 3,367,220 | 2/1968 | Copeland | 82—35 |
| 3,379,080 | 4/1968 | Massa | 82—72 |

HARRISON L. HINSON, Primary Examiner

U.S. Cl. X.R.

82—20, 37, 101